United States Patent [19]

Molitorisz

[11] 3,996,848

[45] Dec. 14, 1976

[54] ROTARY COMPACTING MACHINE FOR FIBROUS MATERIAL

[76] Inventor: Joseph Molitorisz, 624 81st Ave., NE., Bellevue, Wash. 98004

[22] Filed: Aug. 4, 1975

[21] Appl. No.: 601,821

Related U.S. Application Data

[63] Continuation-in-part of Ser. No. 327,678, Jan. 29, 1973, Pat. No. 3,899,964.

[52] U.S. Cl. .................................. 100/73; 100/89; 100/DIG. 7
[51] Int. Cl.² .................... B30B 15/30; B30B 3/04
[58] Field of Search ........................... 100/70–75, 100/89, 86, DIG. 7, 40; 56/1

[56] References Cited

UNITED STATES PATENTS

| 1,538,375 | 5/1925 | Berrigen | 100/73 |
| 3,084,620 | 4/1963 | Gibbons | 100/71 |
| 3,386,373 | 6/1968 | Bushmeyer et al. | 100/89 |
| 3,494,281 | 2/1970 | Warnking | 100/89 |
| 3,691,941 | 9/1972 | Molitorisz | 100/89 |

*Primary Examiner*—Peter Feldman

[57] ABSTRACT

In a rotary compacting machine using rolling-compressing techniques sheets of loose fibrous material rolled into a dense continuous cylindrical core in a compression channel, being confined by power driven boundary compression rollers. The circumferentially spaced plurality of compression rollers impart to the material of the core radial, tangential and axial forces. At the end of the compression channel the continuous core is cut to the desired length individual rolls. The skewing position of the compression rollers is automatically regulated and adjusted to obtain the desired density of the core and to provide means to cause the desired axial displacement of the formed core toward and away from the discharge end of the compression channel.

To make this compacting process applicable to biologically active fibrous materials, such as agricultural forage crops at higher moisture contents, an applicator for chemical additives, such as preservatives, is incorporated into the system.

3 Claims, 5 Drawing Figures

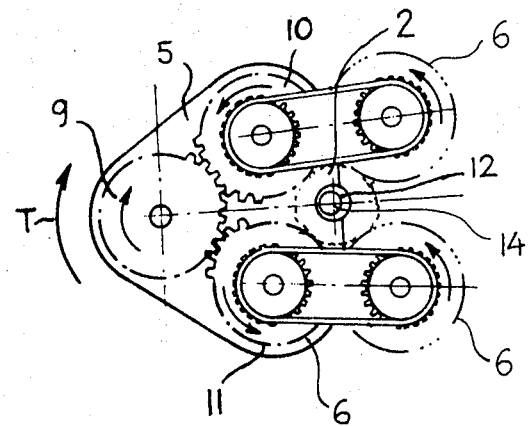
Fig. 2
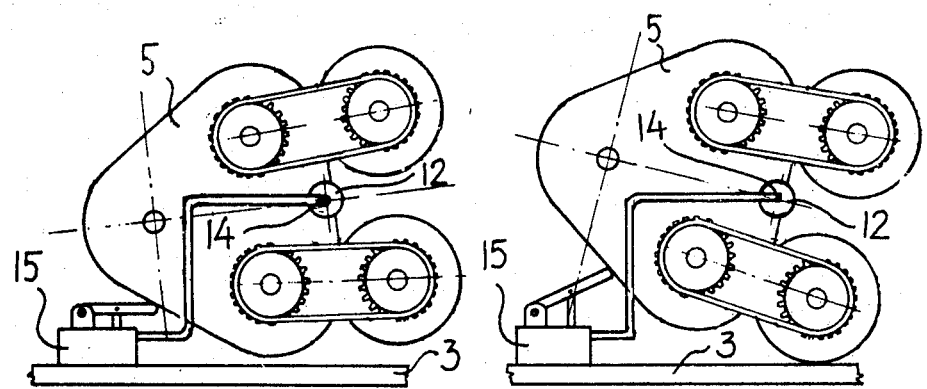
Fig. 3/a.   Fig. 3/b
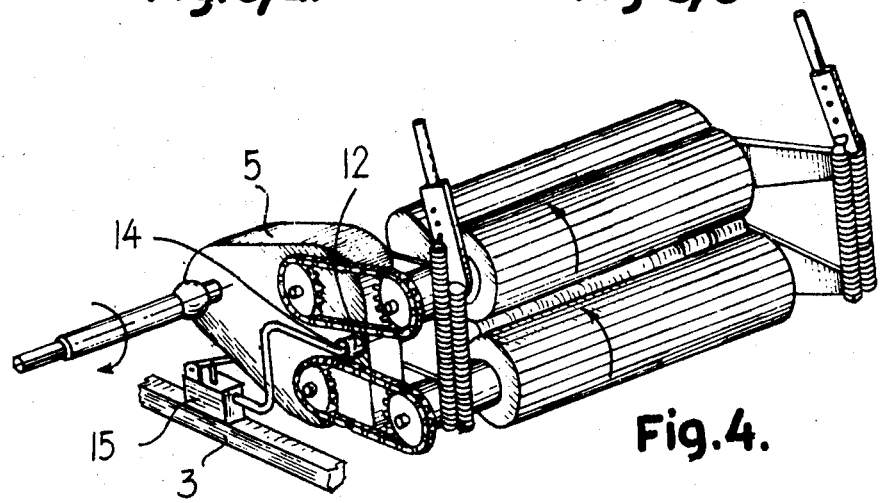
Fig. 4.

ROTARY COMPACTING MACHINE FOR FIBROUS MATERIAL

This application is a continuation-in-part of application Ser. No. 327,678, filed Jan. 29, 1973 now U.S. Pat. No. 3,899,964.

BACKGROUND OF THE INVENTION

1. Field of the Invention

This invention pertains to apparatus for compressing fibrous materials. The invention has particular application to agricultural uses such as the compacting of hay or the like into self-contained cylindrical rolls, and the invention also has industrial utility for the compaction of other materials. The compaction technique is of the type in which sheets of fibrous material are continuously rolled into a core by the imposition of radial, axial and tangential forces in the core-forming channel confined by circumferentially spaced rollers. This technique is known in the art as "rolling-compressing".

2. Description of the Prior Art

The rolling-compressing technique of forming loose fibrous material into dense cylindrical body had its origin in the early part of this century, when several patents were issued on this process.

The same basic technique was applied for the forming of loose fibrous material into dense cylindrical core suitable for cutting into individual wafers.

Roll-forming apparatus of cylindrical, conical and hyperboloid channel configurations have been developed using skewed rollers, channels with large cone angles, or mechanical means in the channel to induce axial displacements of the formed core.

Roller systems with adjustable or self-adjusting skew angles have also been developed in the past.

Means have also been provided to produce axial resistance forces to achieve a desired core density.

Slicing and metering mechanisms for the cutting of the continuous core into the desired length individual rolls were developed.

SUMMARY OF THE INVENTION

This invention is directed toward various unique features employed to produce a practical, commercially feasible mobile or stationary compacting machine which uses the rolling-compressing techniques. While the various features uniquely work in combination to provide an overall optimum machine they are also useful individually and provide unique advantages over similar features of prior art machines.

The first unique feature of my invention is the main gear box which receives the drive from the power source and distributes the power to the compression rollers. Through the unique design the drive system allows two of the driven compression rollers to move radially relative to the confined compression channel in the entire length of the channel, allowing the increase of the diameter of the formed core if and when the rate of intake of the loose material exceeds the rate of discharge of the formed core at a given diameter.

Using the unique system of the main drive, consisting of meshed gears enclosed in the gear box and chain drive for the drive for the compression rollers, the power distribution is continuous and uninterrupted while the radial movement of the compression rollers takes place with the increase of the core diameter. A spring biasing force applied to the deflecting chain-driven rollers exerts the necessary compressive radial force on the core. The magnitude of this biasing force is made adjustable.

The gear box is pivotally supported in journal bearings allowing a limited rotation for the entire power distribution mechanism to form a skew angle by the compression rollers relative to the core for the axial displacement of the compressed material. The limited rotation of the power distribution system is achieved automatically by utilizing the input torque.

The basic differentiation between the automatic skew control mechanism of the prior art machines and this invention can be seen when it is considered that those prior art systems used either external sensing elements which actuated a skew-control mechanism, or they applied a planetary drive mechanism where the power input was through the sun gear. While those systems applying external sensing elements allowed the necessary radial flexibility for the suspension of the compression rollers, the systems based on planetary drive lacked this important feature.

The main gear box as power distribution system has two extreme angular positions; one is the resting position at which the compression rollers are slightly skewed in a "negative" sense relative to the core in the compression channel causing a slow axial movement of the core toward the gear box and away from the discharge end of the channel. By these means the channel remains "primed" at all times during normal operation. The second extreme angular position of the main gear box is achieved by the action of the input torque when it exceeds the magnitude of the counter acting torque produced by the weight of the gear box and by a biasing means connected between the main gear box and the frame, as shown in U.S. Pat. No. 3,899,964. At this position of the gear box the compression rollers are skewed in a "positive" sense relative to the core in the compression channel, causing the axial movement of the core away from the gear box and toward the discharge end of the channel. During operation of the machine the magnitude of the skew angle may vary between its extremes.

Another important and unique feature of this invention is the incorporation and positioning of the applicator for the chemical preservatives. Agricultural forage crops at and above certain moisture contents and under certain storage conditions may demonstrate undesirable biological activities causing molding and in extreme cases spontaneous combustion. There are known chemical preservatives which can be applied to such crops to reduce or to prevent those undesirable biological activities. The rate of application as well as the distribution of these chemicals within the compressed core play a significant role in their effectiveness. In this invention the nozzle or injection pipe is located within the hollow shaft of the main gear box. This hollow shaft serves as the supporting element for the main gear box and it is coaxial with the compression channel. By this positioning of the nozzle or injection pipe the preservative is introduced to the core which at that section of the channel is still at a low density, thus rapid and effective penetration can be achieved. Also that portion of the loose core will become the center of the finished core after the successive layers are wrapped around it. Some of the chemical preservatives being rather volatile, it is of great importance to seal them within the body of the compressed core. Another significant advantage of this mode of application is that the drifting of the misted or sprayed chemical is greatly reduced (by the confined space) and confined within the space which is surrounded by the compression rollers and by the incoming loose sheet of crop. A flow-control valve which determines the rate of application, is mounted in a manner that it remains closed while the main gear box is in its resting or negative skew position but it opens proportionally as the positive skew angle of the compression rollers increases and the movement of the core begins toward the discharge end of the channel. By these application means a relatively uniform distribution of the preservatives can be achieved.

BRIEF DESCRIPTION OF THE DRAWINGS

FIG. 2 is a side elevation of the main gear box showing the hollow shaft through which the nozzle or injection pipe of the applicator is introduced.

FIG. 3a and 3b are side elevations of the main gear box showing its negative and positive skew angle positions, and also showing the flow control valve of the applicator in its closed and opened positions in relation to the skew angles of the main gear box.

FIG. 4 is an isometric schematic view illustrating the general arrangement of the drive train, the compression rollers and the flow control valve of the applicator.

DESCRIPTION OF THE PREFERRED EMBODIMENTS

Figure 1:
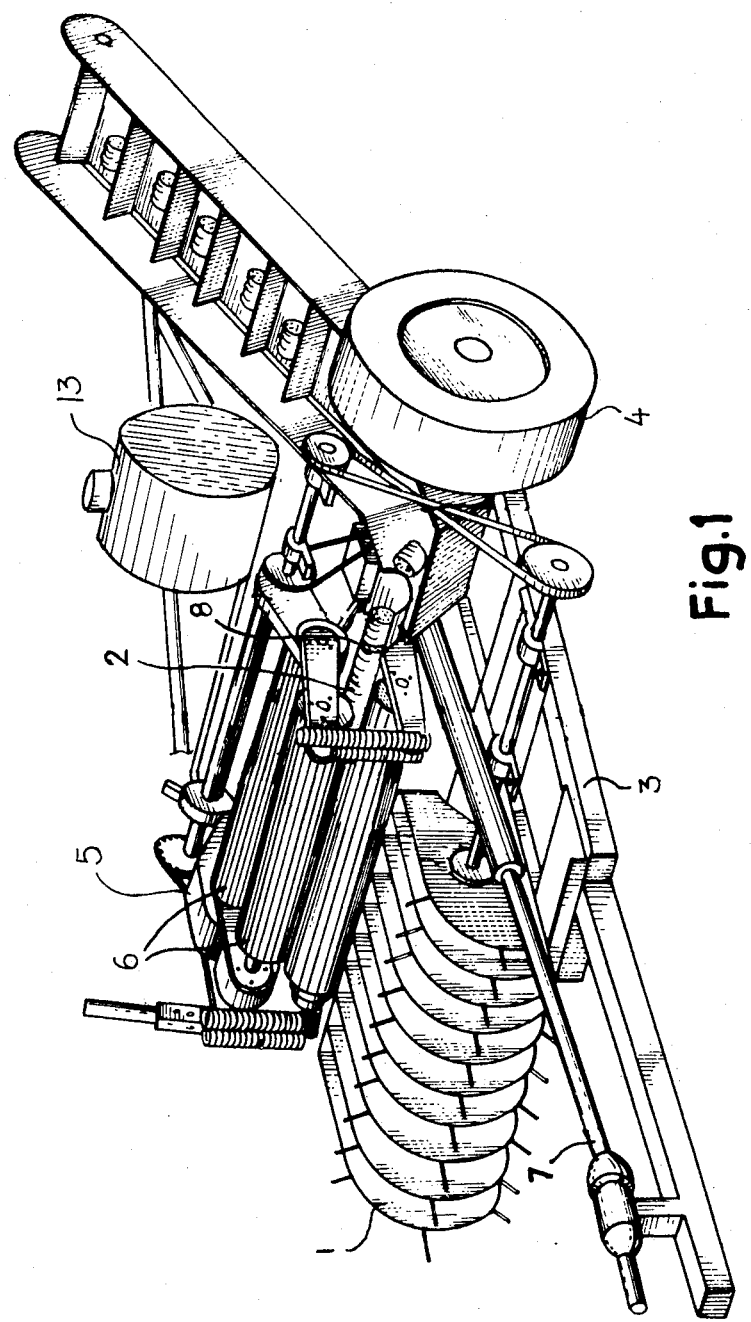
FIG. 1 is an overall perspective view of a rolling-compressing machine embodying the principles of the invention.

Generally stated, the invention is practiced by providing a pickup and conveyor means 1 for directing the loose material into a roller-compressor mechanism where the loose fibrous material is formed into continuous dense cylindrical core 2 which is cut into desired length individual rolls and expelled from the rolling-compressing unit.

The mobile Rotary Compacting Machine illustrated on FIG. 1 comprising a frame structure 3 which is supported by wheels 4. The machine can be drawn by a prime mover such as a tractor. In the embodiment illustrated, the means for compressing the fibrous material into a cylindrical core 2 includes four compression rollers 6. The rollers are powered by a suitable drive train 7 which is connected to the power take-off of the prime mover. The rollers are circumferentially spaced to confine the core forming channel. A space is provided between two adjacent rollers as a transverse inlet into the channel. The skewing of the roller system provides the core formed in the channel with an axial force to move the core either toward the discharge exit 8 of the channel, or toward the driven end of the channel. Both the driven and the discharge ends of at least two of the compression rollers are mounted for radial movement relative to the core forming channel and are spring biased inwardly by biasing springs. The main power drive transmission system consists of an input shaft with an attached gear 9 on FIG. 2, which is meshed with two other journally supported gears 10, and 11 transmitting the power to the compression rollers. The rotatable suspension of the main gear box 5 is being provided by the hollow shaft 12. The weight of the gear box assembly and a biasing means connected between the main gear box and the frame, as shown in U.S. Pat. No. 3,899,964 urges the main gear box in an angular position at which the compression rollers have a small negative skew angle relative to the axis of the compression channel, as shown on FIG. 3a. The input torque which is acting on the input gear 9 tends to cause a rotation of the main gear box placing the compression rollers in a positive skew angle relative to the axis of the compression channel, as shown on FIG. 3b.

The tank and pressurizing system 13 for the preservative applicator is mounted on a convenient position on the frame 3. The nozzle or injecting pipe 14 is mounted in the hollow shaft 12 directing the preservative toward the compression channel FIG. 4. The flow control valve 15, is connected to the main gear box 5 and is actuated by the change in the angular position of the main gear box. When the skew angle of the compression system is negative the flow of the preservative is interrupted, FIG. 3a. With the increase of the positive skew angle of the flow of the preservative is allowed and its rate of application increased, FIG. 3b.

While the preferred forms of the invention have been illustrated, and described, it should be understood that changes may be made without departing from the principles thereof. Accordingly, the invention is to be limited only by a literal interpretation of the claims appended hereto.

I claim:

1. A rolling-compressing machine for forming loose fibrous material, such as hay, into a dense cylindrical core which is cut into individual rolls, comprising: a roller system of a core forming channel, said core forming channel confined by and having a plurality of at least four circumferentially spaced skewed power driven compression rollers, an applicator apparatus for injecting or depositing chemical preservatives into the core of fibrous material as it is being formed in the core forming channel, the compression rollers being power driven and flexible supported by a power transmission gear box, said power transmission gear box being allowed to make limited and adjustable rotational movement about its supporting axis and being urged by its own weight and by an adjustable biasing means into a position where said compression rollers are skewed relative to said core forming channel urging the axial movement of said core in said core forming channel toward the power transmission gear box and away from the discharge end of said core forming channel, said power transmission gear box having a power input shaft, said power input shaft exerting a torque urging said power transmission gear box to rotate in a direction opposite to the torque exerted by the own weight of said power transmission gear box, and by an adjustable biasing means, when the magnitude of the torque applied at the power input shaft is greater, said rotational movement of said power transmission gear box causing the skewed arrangement of said compression rollers relative to said core forming channel urging the axial movement of said core in the core forming channel toward the discharge end of said core forming channel and away from said power transmission gear box.

2. A mobile or stationary rolling-compressing compacting machine having a plurality of circumferentially arranged compression rollers confining a core forming channel, said compression rollers being power driven and flexible supported by a power transmission gear box, said power transmission gear box being allowed to make limited and adjustable rotational movement about its supporting axis and being urged by its own weight and by an adjustable biasing means into a position where said compression rollers are in a skewed arrangement relative to said core forming channel urging the axial movement of said core in said core forming channel toward the power transmission gear box and away from the discharge end of said core forming channel, said power transmission gear box having a power input shaft, said power input shaft exerting a torque urging said power transmission gear box to rotate in a direction opposite to the torque exerted by an adjustable biasing means and by the own weight of said power transmission gear box when the magnitude of the torque applied at the power input shaft is greater, said rotational movement of said power transmission gear box causing the skewed arrangement of said compression rollers relative to said core forming channel urging the axial movement of said core in said core forming channel toward the discharge end of said core forming channel and away from said power transmission gear box, an applicator apparatus for injecting or depositing chemical preservatives into the core of fibrous material as it is being formed in the core forming channel, said applicator apparatus having valve means connected to said power transmission gear box, said rotational movement of said power transmission gear box being used to control and adjust said applicator valve means by interrupting or reducing the application of chemical additives when said compression rollers are skewed relative to said core forming channel urging the axial movement of said core in said core forming channel toward the power transmission gear box and away from the discharge end of said core forming channel, and said rotational movement of said power transmission gear box being used to control and adjust said applicator valve means to initiate or to increase the application of chemical additives, such as preservatives, when said compression rollers are skewed relative to said core forming channel urging the axial movement of said core in said core forming channel toward the discharge end of said core forming channel, and away from said power transmission gear box.

3. A rolling-compressing compacting machine for forming loose fibrous material, into a dense cylindrical core which is cut into individual rolls, comprising: a roller system of a core forming channel, said core forming channel being confined by and having a plurality of at least four circumferentially spaced power driven skewed compression rollers, a cutting mechanism to sever the continuous core of fibrous material after it is formed in the roller system, into desired length individual rolls, an applicator apparatus for injecting chemical additives, such as preservatives, into the core of fibrous material as it is being formed in the core forming channel, a nozzle or injection system of said applicator (apparatus) being located in the hollow shaft of the power transmission gear box at the drive end of said core forming channel introducing the chemical additives at the space which is confined by said circumferentially spaced compression rollers, said nozzle or injection system being oriented to apply the chemical additives toward the partially formed and not fully compacted core of fibrous material in the core forming channel, the confined location of said nozzle or injection system of said applicator apparatus being arranged to reduce the drifting of said chemical additives and allow rapid penetration in said partially formed loose core of fibrous material in said core forming channel, said partially formed loose core of fibrous material together with the applied chemical additives being wrapped by successive layers of fibrous material as said loose core moves axially under the action of said skewed compression rollers.

* * * * *